United States Patent [19]
Kuramatsu

[11] Patent Number: 5,734,686
[45] Date of Patent: *Mar. 31, 1998

[54] SELECTIVE POWER SUPPLY CONTROL FOR BATTERY SAVING EFFECTIVELY

[75] Inventor: Hiroyasu Kuramatsu, Tokyo, Japan

[73] Assignee: NEC Corporation, Tokyo, Japan

[*] Notice: The term of this patent shall not extend beyond the expiration date of Pat. No. 5,440,298.

[21] Appl. No.: 242,835

[22] Filed: May 16, 1994

[30] Foreign Application Priority Data

May 14, 1993 [JP] Japan .................................. 5-113357

[51] Int. Cl.$^6$ .................................................. H04L 7/00
[52] U.S. Cl. ..................... 375/368; 340/825.44; 455/38.3; 455/343
[58] Field of Search ........................... 375/121, 316, 375/368, 365; 340/825.44, 311.1; 455/343, 38.3, 127; 379/98; 364/707; 395/750

[56] References Cited

U.S. PATENT DOCUMENTS

| | | |
|---|---|---|
| 4,652,875 | 3/1987 | Waki .............................. 455/343 X |
| 4,663,623 | 5/1987 | Lax et al. ....................... 340/825.44 |
| 4,839,639 | 6/1989 | Sato et al. ...................... 455/343 X |
| 4,961,073 | 10/1990 | Drapac et al. .................. 455/343 X |
| 5,144,296 | 9/1992 | DeLuca et al. ................. 455/343 X |
| 5,181,227 | 1/1993 | DeLuca et al. ................. 340/825.65 |
| 5,230,084 | 7/1993 | Nguyen ........................... 455/343 X |
| 5,241,568 | 8/1993 | Fernandez et al. ............. 375/368 |
| 5,440,298 | 8/1995 | Kuramatsu ..................... 340/825.44 |

Primary Examiner—Stephen Chin
Assistant Examiner—Bryan Webster
Attorney, Agent, or Firm—Sughrue, Mion, Zinn, Macpeak & Seas, PLLC

[57] ABSTRACT

A radio section demodulates a received signal. A bit pattern detector detects a predetermined bit pattern from the demodulated signal. A bit rate detector detects a period of a transition of one of leading and trailing edges and decides whether or not the period is within a predetermined range. A controller controls power supply to the radio section in response to both of the result at the detection of the bit rate and the bit pattern.

15 Claims, 4 Drawing Sheets

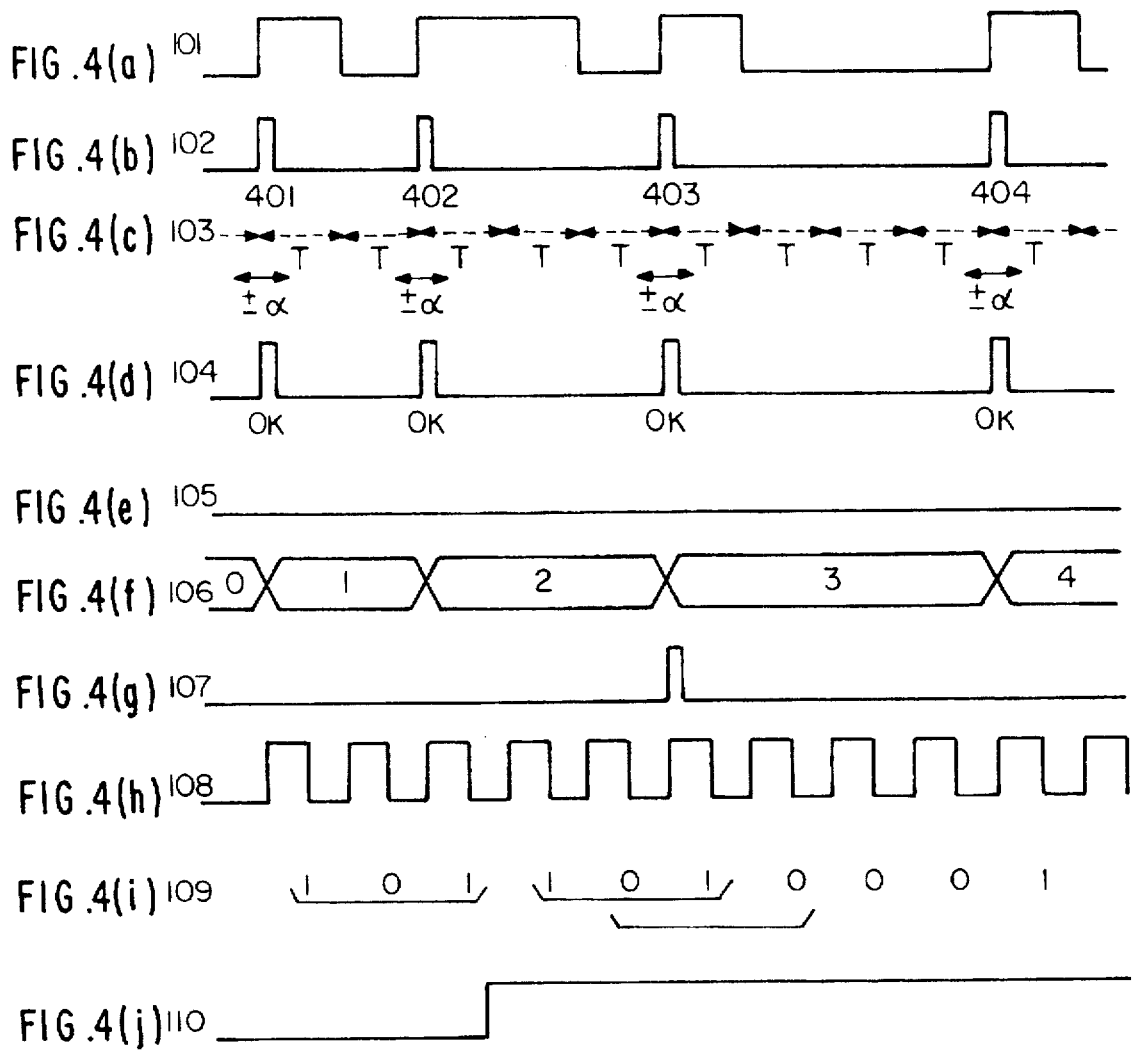

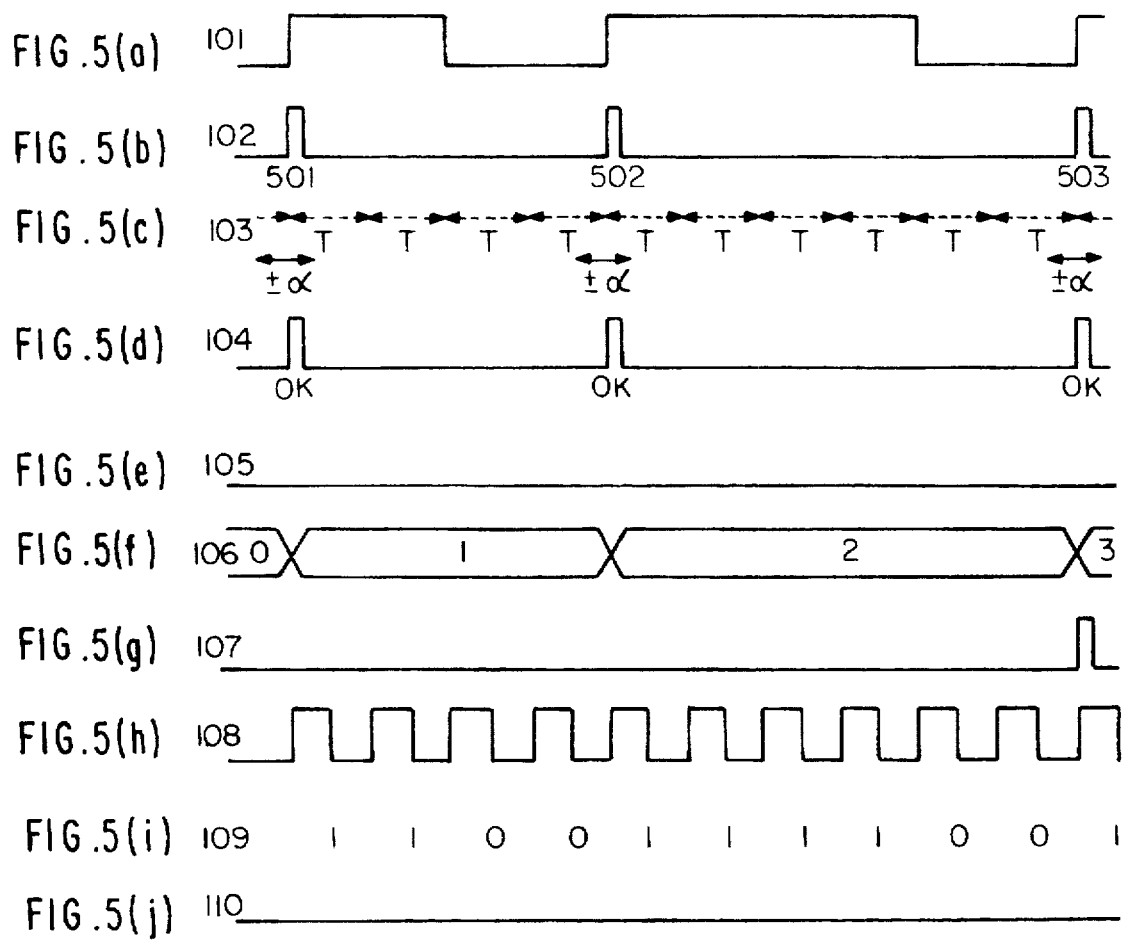

SELECTIVE POWER SUPPLY CONTROL FOR BATTERY SAVING EFFECTIVELY

BACKGROUND OF THE INVENTION

1. Field of the Invention

The present invention relates to a selective power supply control for effective battery saving and, more particularly, to a battery saving technique for selectively supplying power in a radio receiver.

2. Description of the Related Art

In a radio receiver, for example, a selective call receiver such as a paging receiver, battery saving is important in order to keep the battery consumption to a minimum. However, if fading should occur during a receiving mode, the receiver will fail to detect an address codeword causing the receiver return to a standby mode wherein power to a radio section of the receiver is supplied at intervals.

Therefore, a selective call receiver having a data speed detector (bit rate detector) for assuring that the receiver remains in the receiving mode even if fading has occurred during the address word has been proposed by the inventor of the present invention in his Japanese application No. 107151/1993 and corresponding U.S. application Ser. No. 08/052,034. The receiver detects the period of transition in response to one of leading and trailing edges of a received signal and determines whether or not the period of transition is an integral multiple of the unit bit length of the received signal. When the period of transition is an integral multiple of the unit bit length, the receiver determines that the received signal is coincident in bit rate its assigned bit rate and receives the signal. If not so, the receiver determines that the received signal is not coincident in bit rate with it assigned bit rate, i.e., the received signal is noise or a no signal state and returns to the standby mode. This technique is effective for battery saving and signal receiving.

Today, the number of paging service subscribers and the length of transmitted message signals, which may include kanas (Japanese syllabary) and kanjis (Chinese characters) in addition to alert tones, numerals and alphabets have increased greatly. Therefore, there is an increasing demand for higher transmission rates. For this purpose, POCSAG (British Post office Code Standardization Advisory Group), for example, authorizes paging services using bit rates of 512 bps, 1200 bps and 2400 bps. Such different bit rates are sometimes used in a single system. A base station transmits signals having bit rates of 512, 1200 and 2400 bps. However, receiver receives a signal having a single predetermined bit rate, e.g., 2400 bps only.

In such a system, since the above-described receiver proposed by the present inventer compares the period of transition of one of leading and trailing edges of the received signal with integral multiples of the unit bit length assigned to the receiver, the receiver detects signals having a different bit rate from its assigned rate as signals it is authorized to receive. For example, assume a receiver which receives signals whose bit rate is A it determines that the received signals are available to be received when receiving, besides signals having the assigned bit rate A, signals having bit rates of A/2, A/4 and so forth (A÷(2's multiple)). As a result, the receiver interrupts intermittent reception for detecting a preamble and, instead, performs continuous reception for detecting a frame synchronization codeword. Namely, when a receiver which receives signals whose bit rate is 2400 bps receives signals whose bit rate is 1200 bps, it determines that the received signals are signals to be received since the period of transition is an integral multiple of the unit bit length. Therefore, the receiver interrupts intermittent reception, and effects continuous reception for the detection of the frame synchronization codeword. This lowers the battery saving efficiency of the receiver.

SUMMARY OF THE INVENTION

It is therefore an object of the present invention to provide a selective power supply control for the battery saving capable of discriminating signals of bit rates other than a bit rate assigned thereto.

It is another object of the present invention to provide a battery saving technique capable of discriminating, when receiving signals whose bit rate is different from a bit rate assigned thereto,the former from the latter.

According to the present invention, the inventive control includes a bit rate detector for detecting a bit rate of an input signal, a bit pattern detector for detecting a predetermined bit pattern from the input signal end a controller for controlling the power supply to a circuit in response to the detection of the bit rate and the detection of the bit pattern.

BRIEF DESCRIPTION OF THE DRAWINGS

The above and other objects, features and advantages of this invention will become more apparent from the following detailed description taken with the accompanying drawings in which:

FIGS. 4(a) to 4(j) form a timing chart covering various parts of the bit rate detector shown in FIG. 2 and the bit pattern detector shown in FIG. 3 when the receiver shown in FIG. 1 receives signals having a bit rate of 2400 bps; and FIGS. 5(a) to 5(j) farm a timing chart covering various parts of the bit rate detector shown in FIG. 2 and the bit pattern detector shown in FIG. 3 when the receiver shown in FIG. 1 receives signals having a bit rate of 1200 bps.

In the drawings, the same reference numerals denote the same structural elements.

DESCRIPTION OF THE PREFERRED EMBODIMENT

Now there will be described in detail preferred embodiments of the present invention with reference to FIGS. 1 to 5.

Figure 1:
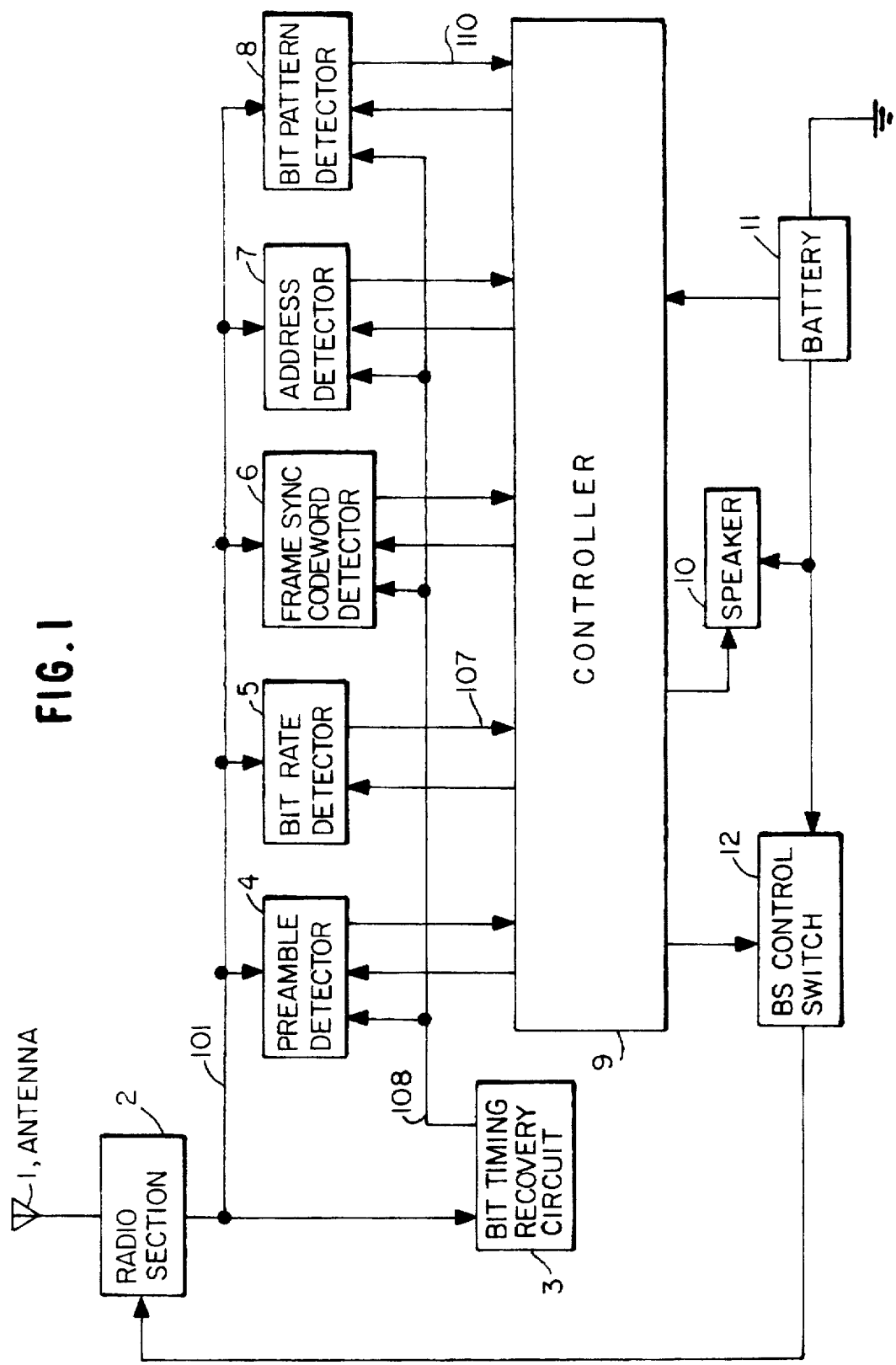
FIG. 1 is a block diagram of a preferred embodiment of a receiver using the present invention.

FIG. 1 is a block diagram schematically showing a preferred embodiment of a receiver embodying the present invention. In FIG. 1, the receiver consists of an antenna 1, a radio section 2, a bit timing recovery circuit 3, a preamble detector 4, a bit rate detector 5, a frame synchronization codeword detector 6, an address detector 7, a bit pattern detector 8, a controller 9, a speaker 10, a battery 11 and a battery saying (BS) control switch 12.

A signal detected by the antenna 1 is fed to the radio section 2 which amplifies the received signal, converts its frequency, and demodulates it to produce a baseband signal. The demodulated signal from the radio section 2 is applied to the bit timing recovery circuit 3 to which a reference clock is supplied from a crystal oscillator (not shown). The bit timing recovery circuit 3 feeds a recovered clock to various parts of the receiver by timing the recovered clock to the demodulated signal of the radio section 2. The recovered clock of bit timing recovery circuit 3 is supplied to the preamble detector 4, the frame synchronization codeword detector 6, the address detector 7 and the bit pattern detector 8 to which the baseband signal is also coupled from the radio section 2. The outputs of the detectors 4, 6, 7 and 8 and the bit rate detector 5 are coupled to the controller 9 which processes the input signals and produces enable signals for subsequent signal detection of the received signal. Additionally, the controller 9 makes a decision on whether the received signal is out of timing with the standard bit rate established by the receiver.

The radio section 2 is powered via the BS control switch which is controlled by the controller 9. The controller 9 feeds a battery saving control signal to the BS control switch 11 during a standby mode, so that the radio section 2 is intermittently powered to allow the preamble detector 4 to search for a preamble signal which is a repetition of 1's and 0's. Within the period of this preamble signal, the receiver enters a sync setup mode to establish bit timing synchronism. More specifically, the controller 9 is arranged to receive a preamble detect signal, a frame synchronization codeword detect signal and an address codeword detect signal, generates a battery saving control signal intermittently at first predetermined intervals while the receiver is in a standby mode, and generates the control signal intermittently at second predetermined intervals corresponding to the frame synchronization codeword An each of batches in response to the reception of the preamble detect signal. In addition, the controller 9 generated the control signal at a predetermined taming corresponding to the address codeword in each of the batches in response to the reception of the synchronization code word detect signal to allow the receiver to receive the address codeword.

The preamble detector 4 monitors a preamble signal synchronized with the recovered clock and feeds the preamble detect signal to the controller 9 when the preamble detector 4 has detected a preamble signal. In response to the preamble detect signal, the controller 9 applies a turn-on signal to the BS control switch 11 to continuously power the radio section 2. At the same time, the controller 9 enables the frame synchronization codeword detector 6 to search for the synchronization (sync) codeword of the first batch that immediately follows the preamble signal. Upon detection of the sync codeword of the first batch by the frame synchronization codeword detector 6, the receiver enters an address receiving mode. The controller 9 now turns off the radio section 2, uses the detected sync codeword as the start timing of the first batch to determine the particular frame of the receiver and turns on the radio section 2 for the duration of the particular frame, while at the same time enabling the address detector 7 to search for an address codeword which may be contained in the frame.

The address detector 7 supplies an address detect signal to controller 9 if the received address codeword is identical to the address of the receiver. The controller 9, in response, applies an alert signal to the speaker 10, whereby the speaker produces an alert tone.

Assume that the synchronization fails at the N-th batch, due to fading or similar propagation trouble. Although it may operate to try to set up synchronization again, the preamble signal is not detected. As a result, the receiver returns to the standby mode and cannot receive signals of the N+1 batch and the following successive batches because the receiver is unable to gain synchronization. In light of this, the embodiment is constructed such that even when the preamble signal is not detected, the receiver supplies the power to the radio section continuously in order to detect the next sync codeword in the next batch, if the output of the bit rate detector 5 and that of the bit pattern detector 8 indicate, in combination, that the signal being received is not noise or a no signal state and that it is a signal whose bit rate is the same as the bit rate of the receiver.

Figure 2:
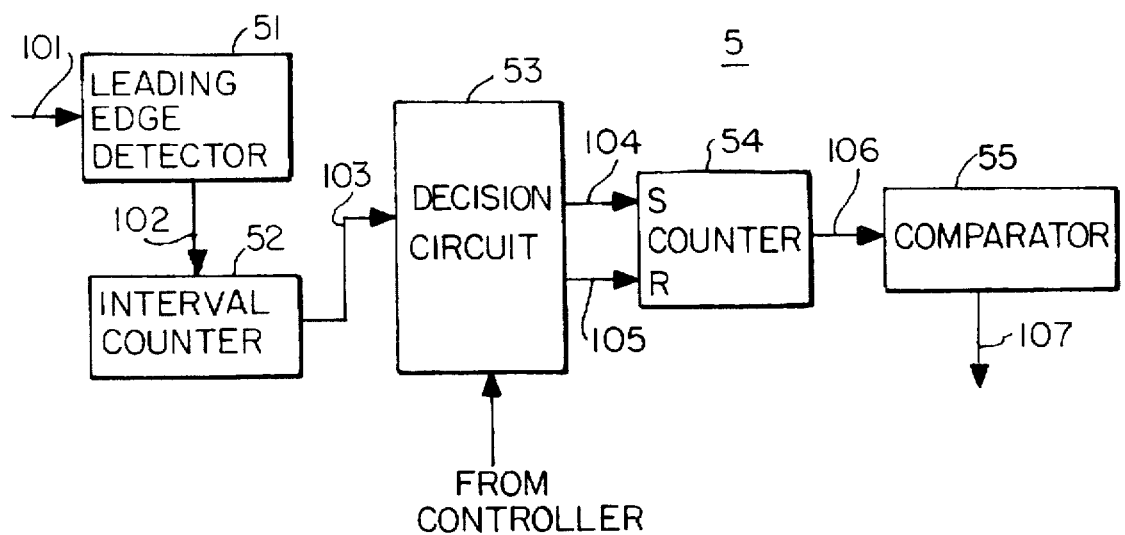
FIG. 2 is a block diagram of a preferred embodiment of the bit rate detector shown in FIG. 1.

FIG. 2 is a block diagram schematically showing a preferred embodiment of the bit rate detector 5 shown in FIG. 1. In FIG. 2, the bit rate detector 5 consists of a leading edge detector 51, an interval counter 52, a decision circuit 53 and a counter 54 and a comparator 55.

With reference to FIGS. 1 and 4(a)-4(j), the leading edge detector 51 produces a transition pulse 102 in response to the leading edge of each pulse 101 from the radio section 2. The interval detector 52 responds to the transition pulse 102 from the leading edge detector 51 by counting local clock pulses from a crystal oscillator (not shown) to increment a count value and resets the count value in response to the next transition pulse and feeds the final count value 103 to the decision circuit 53 as an indication of the length of the interval between the leading edges of successive pulses, while restarting the count operation to measure the next pulse interval. When enabled by the controller 9, the decision circuit 53 compares the output 103 of the interval counter 52 with a range of reference values and provides a first decision output 104 to the count; input of the counter 54 when the length of pulse interval lies within the reference range or a second decision output 105 to the count input of the counter 54 when it is outside the reference range. Preferably, the reference range is given by the relation M * T ±α, where M is an integer including unity, T is the bit length of the transmitted signal, and α is an allowance value determined by the particular operating characteristics of the radio section.

The counter 54 increments a count value in response to the signal 104, resets the count value in response to the signal 105 and outputs the count value 106. The comparator 55 compares the count value 106 with a predetermined value and applies a pulse 107 to the controller 9 when the count value 106 is equal to the predetermined value.

Figure 3:
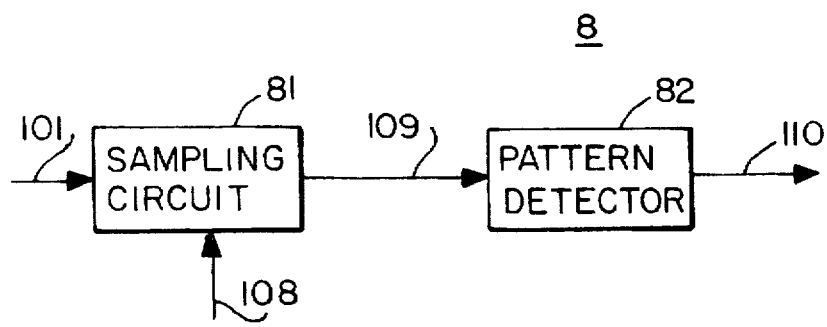
FIG. 3 is a block diagram of a preferred embodiment of the bit pattern detector shown in FIG. 1.

FIG. 3 is a block diagram schematically showing a preferred embodiment of the bit pattern detector 8 shown in FIG. 1. In FIG. 3, the bit pattern detector 8 consists of a sampling circuit 81 and a pattern detector 84.

The sampling circuit 81 samples the received signal 101 from the radio section 2 by the recovered clock 103 from the bit timing recovery circuit 3. The pattern detector 82 determines whether or not a predetermined pattern exists in the output signal 109 of the sampling circuit 81. The predetermined pattern may be, for example, "101" or "010" when the bit rate of the signal is 2400 bps. These patterns exist in the signal whose bit rate is 2400 bps but not exist in the signal whose bit rate is 1200 bps.

The controller 9 determines, based on both the outputs 107 and 110 of the bit rate detector 5 and bit pattern detector 8, whether or not the received signal has a bit rate identical with the bit rate assigned to the receiver.

Next, a preferred operation of the embodiment will be described with reference to FIGS. 4(a)-4(j) and 5(a)-5(j) and on the assumption that the receiver whose bit rate is 2400 bps receives signals of bit rate of 2400 bps and signals of bit rate of 1200 bps.

FIGS. 4(a)-4(j) and 5(a)-5(j) respectively demonstrate how signals change in the bit rate detector 5 and bit pattern detector 8 when the receiver receives signals of bit rate of 2400 bps and when it receives signals of bit rate of 1200 bps, The received signal 101 whose bit rate is 2400 bps is assumed to be "1011010001" (FIG. 4(a)). The transition of the received signal 01 from "0" to "1" occurs at points 401, 402, 403 and 404 (FIG. 4(b)). Since all these transition points 401 to 404 is within the range (T*M±α) (FIG. 4(c)), a count-up pulse 104 is generated at each point by the decision circuit 53 while the counter output 106 is sequentially incremented as 1, 2, 3 and 4. If the transition point is not within the range, a count-reset pulse 105 is generated. When the counter output 106 exceeds a predetermined reference value, preferably 2, the comparator 55 delivers a count-over pulse 107 to the controller 9.

On the other hand, the received signal 101 is sampled at the negative-going edges of the recovered clock 108 which is bit-synchronous to the signal 101 by the sampling circuit S1. The resulting sampled data 109 is "1011010001". The pattern detector 82 detects "101" or "010" out of such sampled data 109 with the result that the pattern detection signal 110 goes high.

The receiver whose bit rate is 2400 bps is constructed such that when the bit rate detector 5 outputs a count-over pulse 107 and the pattern detection signal 110 is indicative of the presence of the predetermined pattern, the controller 9 determines that the signal being received is of the bit rate assigned thereto.

The controller 9 determines, based on the result of the above decision, that the signal being received is of the bit rate assigned to the receiver, and starts the mode for detecting the next frame synchronizing signal.

In the above embodiment, a bit rate detecting signal 107 is applied to the controller 9 in order to assure the detection of the bit rate when the count output 106 is equal to 2. However, the predetermined reference may be i or greater than 2. Similarly, when a bit pattern is detected twice, a bit pattern detection signal 110 may be delivered.

Assume that the received signal 101 whose bit rate bps is "11001111001" as shown in FIG. 5(a) Then, the transition of the signal 101 from "0" to "1" occurs at points 501, 502 and 503 (FIG. 5(b)). All of them are within the range (T*M±α) (FIG. 5(c)). In this condition, a count-up pulse 104 appears at each transition point (FIG. 5(d)), and the counter output 106 is sequentially incremented as 1, 2 and 3 (FIG. 5(f)). When the counter output 106 exceeds the predetermined reference value 2, a count-over pulse 107 is generated (FIG. 5(g)).

It has been determined, based only on the count-over pulse 107, that a received signal has a bit rate assigned to the receiver and the receiver starts on the mode for detecting the next frame synchronizing signal.

However, the present invention does not execute such a procedure. Specifically, the signal 101 is sampled at the negative-going edges of the recovered clock 108 which is bit-synchronous to the signal 101 (FIG. 5(h)). The sampled data 109 is "11001111001" (FIG. 5(i)). Therefore, the pattern detector 82 cannot detect the pattern "101" or "010" out of the sampled data 109. As a result, the pattern detection signal 110 is indicative of the absence of the pattern (FIG. 5(j)).

In response to such a pattern detection signal 110, the controller 9 determines that the received signal does not have the bit rate assigned thereto, thereby continuing intermittent reception for battery power saving.

When the bit rate assigned to the receiver is 1200 bps, the receiver will be constructed as follows. The frequency at which the sampling circuit 81 of the bit pattern detector 8 samples the received signal 101 is doubled so as to perform detection on a 2400 bps basis. When the bit rate detector 5 generates a count-over pulse 107 and the pattern detection signal 110 from the bit pattern detector 8 is indicative of the absence of the pattern, the controller 9 determines that the received signal is of the bit rate assigned to the receiver, switches from the battery saving mode to the continuous mode, and starts on the mode for detecting the next frame synchronization codeword.

In this manner, the controller 9 determines whether or not the signal being received is of the bit rate assigned to the receiver, by referencing both the count-over pulse 107 from the bit rate detector 5 and the pattern detection signal 110 from the bit pattern detector 8. Only if the result of this decision is positive, the controller 9 switches the battery saving mode and supplies the power to the radio section for detecting the next frame synchronization codeword.

As stated above, in accordance with the present invention, when a receiver having a bit rate A receives data of bit rate A/2, it does not detect a predetermined pattern although it detects the bit rate. Hence, the receiver determines that data being received belongs to a different receiver, and continues intermittent reception. This prevents the battery saving efficiency from being lowered.

In summary, power supply control of a radio receiver of the present invention has a bit pattern detector for detecting a predetermined bit pattern out of a digital signal received and demodulated. Hence, when the receiver receives signals whose bit rate differs from a bit rate assigned thereto, it can discriminate the former from the latter.

Furthermore, a control section included in the receiver controls the power supply to a radio section by referencing not only the result of decision by a comparator, which is included in the bit rate detector, but also the output of the bit pattern detector. Therefore, even when the receiver receives data having a bit rate different from the bit rate of the pagers, the controller detects it and executes battery saving.

Although the embodiment has been described with respect to a case in which the modification was based on a specific factor, it goes without saying that the present invention is not restricted to this case.

What is claimed is:

1. A selective power supply control, which controls a power supply to a circuit for receiving an input signal, for battery saving, comprising:

a bit rate detector for detecting a bit rate of the input signal;

a bit pattern detector for detecting a predetermined bit pattern different from a preamble of the input signal; and a controller for controlling the power supply to said circuit in response to the result of the detection of the bit rate and the result of the detection of the bit pattern, wherein said controller supplies the power to said circuit continuously when both of a predetermined bit rate and a predetermined bit pattern are detected and supplies the power to said circuit at an interval when one of said predetermined bit rate and said predetermined bit pattern is not detected.

2. The control as claimed in claim 1, wherein said bit rate detector comprises:

a detector for detecting a period of a transition of one of first logical level and second logical level of the input signal; and a decision circuit for deciding whether or not the period of the transition is within a predetermined range.

3. The control as claimed in claim 2, wherein said bit rate detector comprises:

a leading edge detector for detecting said transition from the first logical level to the second logical level; and an interval counter for counting the period of said transition.

4. The control as claimed in claim 2, said bit rate detector further comprising:

a counter for incrementing a count value when the period is within said predetermined range and for resetting the count value when the period is not within the predetermined range; and a comparator for comparing the count value with a predetermined reference value.

5. The control as claimed in claim 2, said predetermined value is an integral multiple of a unit bit length.

6. The control as claimed in claim 1, wherein said bit pattern detector comprises:

a sampling circuit for sampling said input signal at a recovered clock from said input signal; and means for detecting whether or not said predetermined bit pattern exists in an output signal of said sampling circuit.

7. The control as claimed in claim 1, wherein said circuit is a radio section.

8. A selective power supply control which controls a power supply to a circuit for receiving an input signal, comprising:

bit rate detecting means for detecting a bit rate of the input signal based on a transition of one of first and second logical levels of said input signal;

bit pattern detecting means for detecting a predetermined bit pattern different from a preamble of said input signal; and control means for controlling a power supply to said circuit in response to both of the result of the bit rate detection and the result of the bit pattern detection, wherein said control means supplies the power to said circuit continuously when both of a predetermined bit rate and a predetermined bit pattern are detected and supplies the power to said circuit at an interval when one of said predetermined bit rate and said predetermined bit pattern is not detected.

9. The control as claimed in claim 8, wherein said bit rate detecting means comprises:

leading edge detecting means for detecting the transition from said first logical level to said second logical level of said input signal;

interval counting means for counting a period of said transition;

deciding means for deciding whether or not said period is within a predetermined range and for supplying a first signal when said period is within said predetermined range and a second signal when said period is not within said predetermined range.

10. The control as claimed in claim 9, said bit rate detecting means further comprising:

counting means for incrementing a count value in response to said first signal and for resetting the count value in response to said second signal; and comparing means for comparing said count value with a predetermined reference value and for supplying a bit rate detecting signal when said count value is equal to the predetermined reference value.

11. The control as claimed in claim 9, said predetermined range is an integral multiple of a unit bit length.

12. A radio receiver comprising:

a radio section for demodulating a received signal and for supplying a demodulated signal;

a bit rate detector for detecting a transition of said demodulated signal from a first logical level to a second logical level, for counting a period of said transition, for deciding whether or not said period is within a predetermined range and for supplying a bit rate detection signal when said period is within said predetermined range;

a bit pattern detector for detecting a predetermined bit pattern different from a preamble of said demodulated signal and for supplying a bit pattern detection signal when said bit pattern is detected; and a controller for controlling a power supply to said radio section in response to said bit rate detection signal and said bit pattern detection signal, wherein said controller supplies the power to said radio section continually when both a predetermined bit rate and a predetermined bit pattern are detected and supplies the power to said radio section at an interval when said predetermined bit rate is detected and said predetermined bit pattern is not detected.

13. A method for controlling a selective power supply to a circuit for receiving an input signal, the method comprising the steps of:

(a) detecting a bit rate of said input signal;

(b) detecting a predetermined bit pattern different from a preamble of the input signal; and (c) controlling a power supply to said circuit continuously when both of a predetermined bit rate and a predetermined bit pattern are detected and at an internal when one of said predetermined bit rate and said predetermined bit pattern is not detected.

14. The method for controlling the power supply as claimed in claim 13, wherein said step (a) comprises the step of:

(d) detecting a period of the transition of one of a leading and trailing edges;

(e) deciding whether or not the period is within a predetermined range; and (f) supplying the result of the decision.

15. The method for controlling the power supply as claimed in claim 13, wherein said step (b) comprises the step of:

(g) sampling the input signal at a recovered clock from the input signal; and (h) detecting a predetermined pattern from the sampled signal.

* * * * *

UNITED STATES PATENT AND TRADEMARK OFFICE
CERTIFICATE OF CORRECTION

PATENT NO.   : 5,734,686
DATED        : March 31, 1998
INVENTOR(S)  : Kuramatsu

It is certified that error(s) appears in the above-identified patent and that said Letters Patent is hereby corrected as shown below:

Column 1, line 23, delete "107151" and insert --107181--;

Column 5, line 16, delete "S1" and insert --81--;

Column 5, line 33, delete "i" and insert --1--.

Signed and Sealed this

Fourteenth Day of July, 1998

Attest:

BRUCE LEHMAN

Attesting Officer

Commissioner of Patents and Trademarks